(12) United States Patent
Burdeniuc et al.

(10) Patent No.: US 10,023,678 B2
(45) Date of Patent: *Jul. 17, 2018

(54) PROCESS FOR PRODUCING FLEXIBLE POLYURETHANE FOAM USING NATURAL OIL POLYOLS

(71) Applicant: EVONIK DEGUSSA GMBH, Essen (DE)

(72) Inventors: Juan Jesus Burdeniuc, Colmar, PA (US); James Douglas Tobias, Center Valley, PA (US); Renee Jo Keller, Orwigsburg, PA (US)

(73) Assignee: Evonik Degussa GmbH, Essen (DE)

( * ) Notice: Subject to any disclaimer, the term of this patent is extended or adjusted under 35 U.S.C. 154(b) by 29 days.

This patent is subject to a terminal disclaimer.

(21) Appl. No.: 14/867,114

(22) Filed: Sep. 28, 2015

(65) Prior Publication Data

US 2016/0032042 A1 Feb. 4, 2016

Related U.S. Application Data

(62) Division of application No. 13/534,239, filed on Jun. 27, 2012, now Pat. No. 9,145,466.

(60) Provisional application No. 61/505,259, filed on Jul. 7, 2011.

(51) Int. Cl.
| | |
|---|---|
| *C08G 18/08* | (2006.01) |
| *C08G 18/30* | (2006.01) |
| *C08G 18/32* | (2006.01) |
| *C08G 18/48* | (2006.01) |
| *C08G 18/66* | (2006.01) |
| *C08G 18/76* | (2006.01) |
| *C08G 18/36* | (2006.01) |
| *C08G 18/34* | (2006.01) |
| *C08G 101/00* | (2006.01) |
| *C08K 5/00* | (2006.01) |
| *C08K 5/05* | (2006.01) |
| *C08K 5/06* | (2006.01) |
| *C08K 5/20* | (2006.01) |
| *C08K 5/315* | (2006.01) |
| *C08K 5/3445* | (2006.01) |
| *C08K 5/41* | (2006.01) |
| *C08K 5/45* | (2006.01) |

(52) U.S. Cl.
CPC .......... *C08G 18/14* (2013.01); *C08G 18/302* (2013.01); *C08G 18/3206* (2013.01); *C08G 18/343* (2013.01); *C08G 18/36* (2013.01); *C08G 18/4841* (2013.01); *C08G 18/6696* (2013.01); *C08G 18/7621* (2013.01); *C08G 2101/005* (2013.01); *C08G 2101/0008* (2013.01); *C08G 2101/0083* (2013.01); *C08J 2205/06* (2013.01); *C08K 5/0008* (2013.01); *C08K 5/05* (2013.01); *C08K 5/06* (2013.01); *C08K 5/20* (2013.01); *C08K 5/315* (2013.01); *C08K 5/3445* (2013.01); *C08K 5/41* (2013.01); *C08K 5/45* (2013.01)

(58) Field of Classification Search
CPC .. C08G 18/14; C08G 18/302; C08G 18/3206; C08G 18/343; C08G 18/36; C08G 18/4841; C08G 18/6696; C08G 18/7621; C08G 2101/0008; C08G 2101/005; C08G 2101/0083; C08G 2205/06; C08K 5/0008; C08K 5/05; C08K 5/06; C08K 5/20; C08K 5/315; C08K 5/3445; C08K 5/41; C08K 5/45

See application file for complete search history.

(56) References Cited

U.S. PATENT DOCUMENTS

| | | |
|---|---|---|
| 2,912,414 A | 11/1959 | Schultheis et al. |
| 3,314,834 A | 4/1967 | Walden et al. |
| 3,579,471 A | 5/1971 | Dijkuizen et al. |
| 3,635,906 A | 1/1972 | Jayawant |
| 3,972,846 A | 8/1976 | Mori et al. |
| 4,251,635 A | 2/1981 | Stone |
| 4,394,491 A | 7/1983 | Hoffman |

(Continued)

FOREIGN PATENT DOCUMENTS

| | | |
|---|---|---|
| CA | 2141890 A1 | 8/1995 |
| CN | 101535023 A | 9/2009 |

(Continued)

OTHER PUBLICATIONS

Zhang, et al.; "Substituting Soybean Oil-Based Polyol into Polyurethane Flexible Foams"; Elsevier Science Publishers B.V., GB; vol. 48, No. 22; Oct. 12, 2007; pp. 6656-6667.

*Primary Examiner* — John Cooney
(74) *Attorney, Agent, or Firm* — Andrew H. Chung; Linda S. Li; Jason S. Ngui

(57) ABSTRACT

A composition and process useful to make flexible polyurethane foams and in particular flexible molded polyurethane foams is disclosed. The usage of dipolar aprotic liquids such as DMSO, DMI, sulfolane, N-methyl-acetoacetamide, N, N-dimethylacetoacetamide as well as glycols containing hydroxyl numbers OH#≤1100 as cell opening aides for 2-cyanoacetamide or other similar molecules containing active methylene or methine groups to make a polyurethane foam is also disclosed. The advantage of using cell opener aids results in a) no foam shrinkage; b) lower use levels of cell opener; c) foam performance reproducibility d) optimum physical properties. In addition, combining the acid blocked amine catalyst together with the cell opener and the cell opener aid results in a less corrosive mixture as well as provides a method that does not require mechanical crushing for cell opening.

15 Claims, No Drawings

(56) References Cited

U.S. PATENT DOCUMENTS

| | | |
|---|---|---|
| 4,426,510 A | 1/1984 | DelDonno |
| 4,721,642 A | 1/1988 | Yoshimi et al. |
| 4,751,253 A | 6/1988 | Tylenda |
| 5,714,565 A * | 2/1998 | Nodelman .......... C08G 18/1875 524/770 |
| 6,136,876 A | 10/2000 | Meier et al. |
| 6,248,801 B1 | 6/2001 | Meier |
| 6,387,972 B1 | 5/2002 | Ghobary et al. |
| 6,432,864 B1 | 8/2002 | Wendel et al. |
| 9,334,382 B2 * | 5/2016 | Burdeniuc ............. C08G 18/16 |
| 2004/0242910 A1 | 12/2004 | Dwan ' Isa et al. |
| 2005/0165124 A1 | 7/2005 | Brown |
| 2005/0267228 A1 * | 12/2005 | Andrew ............... C08G 18/092 521/99 |
| 2005/0282921 A1 | 12/2005 | Flanigan et al. |
| 2006/0217451 A1 * | 9/2006 | Bonapersona ..... C08G 18/0852 521/131 |
| 2006/0229375 A1 | 10/2006 | Hsiao et al. |
| 2007/0100010 A1 * | 5/2007 | Creazzo .................. C08J 9/144 521/98 |
| 2009/0326089 A1 | 12/2009 | Haas et al. |
| 2010/0317760 A1 | 12/2010 | Tanguay et al. |

FOREIGN PATENT DOCUMENTS

| | | |
|---|---|---|
| DE | 1005722 B | 4/1957 |
| DE | 2451726 A1 | 5/1976 |
| EP | 1 099 718 A2 | 5/2001 |
| GB | 2 303 372 A | 2/1997 |
| WO | 01/58976 A1 | 8/2001 |
| WO | 01/70842 A2 | 9/2001 |
| WO | 03/016372 A1 | 2/2003 |
| WO | 03/016373 A1 | 2/2003 |
| WO | 03/055930 A1 | 7/2003 |
| WO | 2004/060956 A1 | 7/2004 |
| WO | 2004/096883 A1 | 11/2004 |
| WO | 2006/116456 A1 | 11/2006 |
| WO | WO 2007/127379 * | 11/2007 |
| WO | 2010/057100 A2 | 5/2010 |

* cited by examiner

PROCESS FOR PRODUCING FLEXIBLE POLYURETHANE FOAM USING NATURAL OIL POLYOLS

CROSS-REFERENCE TO RELATED APPLICATIONS

This Application is a divisional of application Ser. No. 13/534,239, filed on 27 Jun. 2012, now allowed.

This application claims the benefit of U.S. Patent Application No. 61/505,259, filed on Jul. 7, 2011. The disclosure of Application No. 61/505,259 is hereby incorporated by reference. The subject matter of the instant invention is related to U.S. patent application Ser. No. 13/178,558 filed on Jul. 8, 2011 and entitled "Additives for Improving Polyurethane Foam Performance". The disclosure of this application is hereby incorporated by reference.

BACKGROUND OF THE INVENTION

The subject matter of the instant invention relates to compositions and methods used for making foam; particularly polyurethane foam obtained by using natural oil polyols.

Flexible molded foams are conveniently produced using tertiary amine compounds that can catalyze the reaction between water and isocyanate (blowing reaction) and between alcohol and isocyanate (gelling reaction). In some particular cases where molded foam parts are produced, delay action catalysts can be more conveniently used because they provide the advantage of slower reactivity during the pouring process. These catalysts are composed of a tertiary amine that have been reacted (or blocked) with an organic acid. As heat is evolved during the polymerization reaction, dissociation of the tertiary amine salts to the tertiary amine catalysts and acid can occur thereby causing the foam to cure. Foam produced in this manner is normally characterized by the presence of a relatively high percentage of closed polyurethane cells causing the foam to shrink when cooling due to its poor dimensional stability.

In order to maintain the dimensional stability the catalysts or acid blocked catalysts were combined with cell openers in an aqueous system. U.S. Pat. No. 6,136,876 and U.S. Pat. No. 6,248,801 discloses a method for making polyurethane foam in which a polyisocyanate is reacted with a polyol in the presence of a urethane catalyst, a blowing agent, optionally a silicon surfactant cell stabilizer and a cell opening additive. The cell opening additive comprises a substance containing an active methylene or methine group. The cell opener can be delivered as a neat liquid or dissolved in one of the components of the formulation such as the surfactant, water, crosslinker, polyol, amine catalyst or catalysts. One example of cell opener containing active methylenic groups is 2-cyanoacetamide. The main disadvantages of dispensing 2-cyanoacetamide in the polyol, crosslinker, surfactant, amine catalyst or catalysts or mixtures of any of the components used in the formulation is the no solubility or negligible solubility of 2-cyanoacetamide. Some amine catalysts or crosslinkers can even react with 2-cyanoacetamide causing the release of ammonia or the formation of colored products. Water could be used as the sole solvent to dispense 2-cyanoacetamide in a polyurethane formulation. However there are a few disadvantages when using water as solvent including: a) poor solubility; b) reduced the cell opening efficiency (requiring higher use level of cell opener); c) foam shrinkage, and; d) poor reproducibility. Other conventional chemical methods for controlling foam shrinkage have drawbacks such as requiring high levels of cell opener (often as high as 1-5 pphp) and/or adversely affecting the physical properties of foam and/or using environmentally undesirable substances and/or using materials that are very difficult to dispense in a liquid form to a polyurethane foam system.

Shrinkage of flexible molded polyurethane foam may also be controlled by using mechanical crushing to open foam cells and improve dimensional stability of foam. Current mechanical methods for cell opening consist mainly of crushing, vacuum rupture or time pressure release.

Upon demolding of a foam article mechanical crushing and breaking of polyurethane foam cells enables the foam to be more dimensionally stable. Another method of breaking foam cells is vacuum-crushing which involves drawing a vacuum on the finished polyurethane product inducing cell rupture. The overall effect of these methods is reduced foam shrinkage.

Other mechanical methods have been used to achieve dimensionally stable foam, such as decreasing cycle production times. For example, demolding the polyurethane foam in three minutes as compare to four minutes will dramatically improve the dimensional stability. Another method for producing dimensionally stable foams is time pressure release (TPR). TPR comprises opening the mold during process to release the internal pressure and then reclosing for the duration of the cure time. The sudden release of internal pressure burst the cell windows, thereby obtaining dimensionally stable foam products.

Mechanical methods usually result in incomplete or inconsistent cell opening and require flexible molded foam producers to invest in additional machinery.

U.S. Pat. No. 3,314,834 discloses diketo compounds form effective potlife extension agents in polyurethane propellants.

U.S. Pat. No. 3,635,906 discloses that certain chelate-forming compounds have the effect of delaying initiation reaction between an organic polyisocyanate and an organic polyhydroxy compound in the presence of an amine free organotin cure rate catalyst.

U.S. Pat. No. 4,426,510 discloses coating or adhesive compositions having extended potlife and short cure time comprising an organic polyol, an organic polyisocyanate, an organozinc cure rate catalyst, and a compound selected form a) beta-dicarbonyl compounds, b) alpha-hydroxy ketones, c) fused aromatic beta-hydroxy ketones and d) beta hydroxyl nitrogen-heterocyclic fused aromatics.

GB 2303372 discloses making polyurethane foams using the mechanical frothing technique and a catalyst system comprising a metal acetyl acetonate and acetyl acetone.

U.S. Pat. No. 4,721,642 discloses a blocked polyisocyanate prepolymer formed by blocking the terminal —NCO group of the polyisocyanate with a blocking agent such as alcohol, phenol, ethyl acetoacetate, e-caprolactam, MEK oxime, diethyl malonate, acetyl acetone, cyanic acid and sodium bisulfite. A polyurethane resin foamable paint comprises an aqueous dispersion composed of blocked polyisocyante prepolymer, additives, chain extender, foaming agent and emulsifier.

CA 2141890 discloses the production of rigid polyurethane, polyisocyanurate and polyurethane urea foams with HCFC blowing agents and optionally a flame retardant and/or chelating agent which is acidic, i.e., having a pKa value from 0 to 10.

U.S. Pat. No. 3,972,846 discloses a curable polyurethane composition comprising a keto compound and a liquid mixture of an organic aliphatic polyfunctional polyisocyanate and a compound having active hydrogen.

U.S. Pat. No. 4,251,635 discloses flexible polyurethane foams having reduced tendency to form burning embers when it is ignited and burned by incorporating a ketone or benzaldehyde into the reaction mixture before foaming.

DE 1 005 722 discloses that reaction of polyols with polyisocyanates can be retarded by adding an imine (the condensation product of a primary amine and an aldehyde or a ketone or a diketone).

DE 2 451 726 discloses a process for slowing down the reaction of isocyanates compounds with polyester polyols in which the polyols contain at least one aldehyde and/or ketone and a mono-amine in the molar ratio of aldehyde or ketone group:amino group from 1:0.1 to 1.

U.S. Pat. No. 6,136,876 discloses a method for preparing flexible polyurethane foam by reacting an organic polyisocyanate with a polyol in the presence of urethane catalyst, water as blowing agent, optionally a silicon surfactant, and a cell opener characterize in that the cell opener comprises an active methylene or methine group containing compound.

U.S. Pat. No. 6,248,801 discloses a method for preparing flexible polyurethane foam by contacting an organic polyisocyanate with a polyol in the presence of urethane catalyst, water as blowing agent, optionally a silicon surfactant cell stabilizer, and a cell opening additive. The cell opening additive comprises an active methylene or methine compound which also contains a tertiary amine.

Polyols useful in the preparation of polyurethane foam from inexpensive and renewable resources are highly desirable to minimize the depletion of fossil fuel and other non-sustainable resources. WO01/70842 A2 describes the formation of rigid polyurethane foam for insulation uses as the reaction product of a polyol selected from a vegetable oil, a mineral oil, a glycol, syrup, or a combination thereof with a polyisocyanate in the presence of a catalyst and at least one blowing agent. US2004/0242910 A1 describes a method to make natural oil polyol made by reaction of natural oil from vegetal or animal source with a multifunctional hydroxyl compound derived from a natural source such as sorbitol in the presence of an alkali metal salt or base such as potassium hydroxide as catalyst. US2005/0282921 A1 provides a cellular material obtained by the reaction of soy-based polyol, petro-based blowing agent, crosslinking agent, a combination of silicone surfactants and isocyanate. US2006/0229375 A1 relates to polyurethane foam made with alkoxylated vegetable oil hydroxylates replacing at least a portion of the typically used petroleum based polyols.

The disclosure of the previously identified patents and patent applications is hereby incorporated by reference.

BRIEF SUMMARY OF THE INVENTION

The instant invention solves problems associated with convention practice by providing a composition and method for making polyurethane foam. This invention relates to the benefits of using dipolar aprotic liquids such as dimethyl sulfoxide (DMSO), 1,3-dimethyl-2-imidazolidinone (DMI), sulfolane, N-methyl-acetoacetamide, N, N-dimethylacetoacetamide as well as glycols containing hydroxyl numbers OH#≤1100 as cell opening aides for 2-cyanoacetamide or other similar molecules containing active methylene or methine groups to make polyurethane foam. The advantage of using the inventive cell opener aids results in: a) no (or substantially no) foam shrinkage; b) lower use levels of cell opener; c) foam performance reproducibility; and d) optimum physical properties. In addition, combining an acid blocked amine catalyst together with the inventive cell opener and the cell opener aid can result in a less corrosive mixture as well as provides a method that does not require mechanical crushing for cell opening.

The use of these compositions can produce foam with superior physical properties including when natural oil polyols (NOPs) are used as raw materials. If NOPs are introduced into conventional formulations to replace conventional polyether polyol, then physical properties such as tensile, tear and elongation can deteriorate yielding finished product with poorer mechanical properties and lower ageing stability. However, this limitation can be overcome by the instant invention when NOPs are used in combination with the additive solutions.

This disclosure relates broadly to a composition and process to make dimensionally stable polyurethane foams. The inventive composition comprises a cell opener, a cell opener aid, a tertiary amine catalyst and optionally an acid. Examples of suitable acids comprise any organic carboxylic acids containing any saturated or unsaturated and substituted or unsubstituted aliphatic or aromatic group with single or multiple acid groups with or without isocyanate reactive groups. Carboxylic acids are normally added to the polyurethane formulation to slow down the activity of the tertiary amine and prevent a fast increase in viscosity which, in the case of molded foams, allows for a more efficient mold-filling operation particularly in cases where molds with complex shapes and geometries are needed. This approach allows filling of small cavities and voids minimizing the number of defective articles. Acids most commonly used for this purpose are monoacids such as acetic acid, propionic acid, butanoic acid, hexanoic acid, 2-ethylhexanoic acid and the like. Other acids can also be used such as those described U.S. Pat. No. 6,387,972 and U.S. Pat. No. 6,432,864; hereby incorporated by reference. Additional Examples of acid comprise formic acid, pentanoic acid, pivalic acid, neoheptanoic acid, neodecanoic acid, neododecanoic acid, 2-ethylhexanoic acid, glycolic acid, gluconic acid, salicylic acid, lactic acid, benzoic acid, phthallic acid, phthallic acid monesters obtained from phthallic anhydride with glycols, polyacids such as polyacrylic acid, mixtures thereof, among others. The inventive process can enable the production of polyurethane foam by maximizing the efficiency of the cell opener and imparting great dimensional stability. The advantage of the process is that no crushing of foam is required after the product is removed from the mold. This results in scrap minimization and provides products with high quality (high dimensional stability). Also, using the cell opener aides reduces the effective amount of cell opener needed.

One aspect of the invention relates to a composition comprising at least one NOP, at least one cell opener, at least one cell opener aid, at least one catalyst and optionally an acid.

Another aspect of the invention relates to a process for making polyurethane foam comprising: utilizing a combination of the inventive compositions in the presence of tertiary amine catalysts or acid blocked tertiary amine catalysts, and to foams obtained from the method and inventive compositions.

DETAILED DESCRIPTION OF THE INVENTION

The inventive composition comprises at least one NOP, a cell opener comprising molecules containing active methylene or methine groups, a cell opener aid comprising at least one dipolar aprotic liquid, a tertiary amine catalyst and optionally an acid. The inventive process can enable the production of polyurethane foam by improving cell opener efficiency and, in the case of molded foams, reducing or eliminating the conventional step of crushing of the foam is required after the product is removed from the mold.

Preparation of Foams

Foams of any of the various types known in the art may be made using the methods of this invention, using typical polyurethane formulations to which have been added a cell opener, a cell opener aid and the amine catalysts. For example, flexible polyurethane foams with excellent physical properties described herein will typically comprise the components shown below in Table 1, in the amounts indicated. The components shown in Table 1 will be discussed in detail below.

TABLE 1

Polyurethane Components

| Component | Parts by Weight |
|---|---|
| Base Polyol | 20-100 |
| Polymer polyol | 0-80 |
| NOP | varied |
| Silicone surfactant | 0.5-10 |
| Blowing agent | 2-4.5 |
| Crosslinker | 0.5-2 |
| Catalyst | 0.25-10 |
| Polyisocyanate | NCO index = 70-115 |

The amount of polyisocyanate used in polyurethane formulations according to the invention is not limited, but it will typically be within those ranges known to those of skill in the art. An exemplary range is given in table 1, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

NCO index=[NCO/(OH+NH)]*100

The NCO index will normally range from about 70 to about 120 and typically about 80 to about 110.

Flexible foams typically use copolymer polyols as part of the overall polyol content in the foam composition, along with base polyols of about 4000-5000 weight average molecular weight and hydroxyl number of about 28-35. Base polyols and copolymer polyols will be described in detail later herein.

Catalysts

The catalysts of the present invention comprise tertiary amines. Tertiary amine catalysts can contain an isocyanate-reactive group or not. Isocyanate reactive groups comprise primary amine, secondary amine, hydroxyl group, amide or urea. Tertiary amine catalysts containing isocyanate reactive groups include both gelling and blowing catalysts. Exemplary gelling catalysts include N,N-bis(3-dimethylaminopropyl)N-isopropanolamine; N,N-dimethylaminoethyl-N'-methyl ethanolamine (DABCO® T, Air Products and Chemicals, Inc. of Allentown, Pa.); N,N,N'-trimethylaminopropyl ethanolamine (POLYCAT® 17, by Air Products and Chemicals, Inc.), N,N-dimethylethanolamine (DABCO® DMEA); N,N-dimethyl-N',N'-2-hydroxy(propyl)-1,3-propylenediamine; dimethylaminopropylamine (DMAPA); (N,N-dimethylaminoethoxy)ethanol, methyl-hydroxy-ethyl-piperazine, bis(N,N-dimethyl-3-aminopropyl)amine (POLYCAT® 15), N,N-dimethylaminopropyl urea (DABCO® NE1060, DABCO® NE1070), N,N'-bis(3-dimethylaminopropyl) urea (DABCO® NE1060, DABCO® NE1070), bis(dimethylamino)-2-propanol, 6-dimethyl-amino-1-hexanol, N-(3-aminopropyl)imidazole, N-(2-hydroxypropyl)imidazole, and N-(2-hydroxyethyl) imidazole. The amount of tertiary amine will normally range from about 0.01 pphp to about 20 pphp and typically from about 0.05 pphp to about 10 pphp.

Exemplary blowing catalysts containing isocyanate reactive groups include 2-[N-(dimethylaminoethoxyethyl)-N-methylamino]ethanol (DABCO® NE200), dimethylaminoethoxyethanol and N,N,N'-trimethyl-N'-3-aminopropyl-bis(aminoethyl) ether (DABCO® NE300). The amount of blowing catalyst will normally range from about 0.01 pphp to about 10 pphp and typically about 0.05 to about 5.0 pphp The catalyst may also comprise tertiary amines that are highly volatile and not isocyanate-reactive. Suitable volatile gelling catalysts may include, for example, diazabicyclooctane (triethylenediamine), supplied commercially as DABCO 33-LV® catalyst, tris(dimethylalminopropyl)amine (Polycat® 9), dimethylaminocyclohexylamine (Polycat® 8) and bis(dimethylaminopropyl)-N-methylamine (Polycat® 77). Suitable volatile blowing catalysts include, for example, bis-dimethylaminoethyl ether, commercially supplied as DABCO® BL-11 catalyst by Air Products and Chemicals, Inc.; as well as pentamethyldiethylenetriamine (POLYCAT® 5, Air Products and Chemicals, Inc.) and related compositions; higher permethylated polyamines; 2-[N-(dimethylaminoethoxyethyl)-N-methylamino]ethanol and related structures; alkoxylated polyamines; imidazole-boron compositions; or amino propyl-bis(amino-ethyl)ether compositions. The amount of the foregoing catalyst will normally range from about 0.01 pphp to about 20 pphp and typically about 0.05 pphp to about 10.0 pphp.

The catalyst compositions may also include other components, for example transition metal catalysts such as organotin compounds, salts of tin, organobismuth and bismuth salts, for example when the desired polyurethane foam is a flexible slab stock. Additional examples of metal catalyst comprise dibutylin dilaureate, dimethyltin dilaureate, dimethyltin diacetate, dibutyltin diacetate, dimethyltin dilaurylmercaptide, dibutyltin dilaurylmercaptide, dimethyltin diisooctylmaleate, dibutyltin diisooctylmaleate, dimethyltin bi(2-thylhexyl mercaptacetate), dibutyltin bi(2-thylhexyl mercaptacetate), stannous octate, other suitable organotin catalysts, or a combination thereof. Other metals can also be included, such as, for example, bismuth (Bi). Suitable bismuth carboxylate salts includes salts of pentanoic acid, neopentanoic acid, hexanoic acid, 2-ethylhexyl carboxylic acid, neohexanoic acid, octanoic acid, neooctanoic acid, isooctanic acid, heptanoic acid, neoheptanoic acid, isoheptanoic acid, nonanoic acid, neononanoic acid, isononanoic acid, decanoic acid, isodecanoic acid, neodecanoic acid, undecanoic acid, isounecanoic acid, neoundecanoic acid, dodecanoic acid, neododecanoic acid, isododecanoic acid, and other suitable carboxylic acids. Other salts of transition metals of lead (Pb), iron (Fe), zinc (Zn) with pentanoic acid, neopentanoic acid, hexanoic acid, 2-ethylhexyl carboxylic acid, octanoic acid, neooctanoic acid, neoheptanoic acid, neodecanoic acid, neoundecanoic acid, neododecanoic acid, and other suitable carboxylic acids may also be included. The amount of metal catalyst, if present, will normally range from about 0.005 pphp to about 20 pphp and typically about 0.01 pphp to about 10 pphp.

Typically, the loading of non-fugitive tertiary amine catalyst(s) for making foam according to the invention will be in the range of 0.1 to 20 pphp, more typically 0.1 to 10 pphp, and most typically 0.1 to 5 pphp. However, any effective amount may be used. The term "pphp" means parts per hundred parts polyol.

Typically, the inventive cell openers and cell opener aids are combined with the catalyst prior to making foam. Cell openers can comprise any suitable molecule containing active methylene or methine groups such as at least one member selected from the group consisting of 2-cyanoacetamide, N-methyl cyanoacetamide, N-ethylcyanoacetamide, N-propylcyanoacetamide, N-butylcyanoacetamide, N-hydroxyethyl-cyanoacetamide. The cell opener aid can comprise any suitable dipolar aprotic liquid such as at least one member selected from the group consisting of DMSO, 1,3-dimethyl-2-imidazolidinone (DMI), sulfolane, N-methyl-acetoacetamide, N, N-dimethylacetoacetamide as well as glycols containing hydroxyl numbers OH#≤1100. The amount of cell opener typically ranges from about 0.01 pphp to about 2.0 pphp and more preferably from 0.01 pphp to 1.0 pphp. The cell opener aid typically ranges from 0.01 pphp to 10 pphp and more preferably from 0.05 pphp to 5 pphp.

Organic Isocyanates

Suitable organic isocyanate compounds include, but are not limited to, hexamethylene diisocyanate (HDI), phenylene diisocyanate (PDI), toluene diisocyanate (TDI), and 4,4'-diphenylmethane diisocyanate (MDI). In one aspect of the invention, 2,4-TDI, 2,6-TDI, or any mixture thereof is used to produce polyurethane foams. Other suitable isocyanate compounds are diisocyanate mixtures known commercially as "crude MDI." One example is marketed by Dow Chemical Company under the name PAPI, and contains about 60% of 4,4'-diphenylmethane diisocyanate along with other isomeric and analogous higher polyisocyanates. While any suitable isocyanate can be used, an example of such comprises isocyanate having an index range from about 80 to about 120 and typically from about 90 to about 110.

Polyol Component

Polyurethanes are produced by the reaction of organic isocyanates with the hydroxyl groups in a polyol, typically a mixture of polyols. The polyol component of the reaction mixture includes at least a main or "base" polyol. Base polyols suitable for use in the invention include, as non-limiting examples, polyether polyols. Polyether polyols include poly(alkylene oxide) polymers such as poly(ethylene oxide) and poly(propylene oxide) polymers and copolymers with terminal hydroxyl groups derived from polyhydric compounds, including diols and triols. Examples of diols and triols for reaction with the ethylene oxide or propylene oxide include ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, and similar low molecular weight polyols. Other base polyol examples known in the art include polyhydroxy-terminated acetal resins, hydroxyl-terminated amines and hydroxyl-terminated polyamines. Examples of these and other suitable isocyanate-reactive materials may be found in U.S. Pat. No. 4,394,491; hereby incorporated by reference. Suitable polyols also include those containing tertiary amine groups than can catalyze the gelling and the blowing reaction of polyurethanes, for example those described in WO 03/016373 A1, WO 01/58976 A1; WO2004/060956 A1; WO03/016372 A1; and WO03/055930 A1; hereby incorporated by reference. Other useful polyols may include polyalkylene carbonate-based polyols and polyphosphate-based polyols.

In one aspect of the invention, a single high molecular weight polyether polyol may be used as the base polyol. Alternatively, a mixture of high molecular weight polyether polyols, for example, mixtures of di- and tri-functional materials and/or different molecular weight or different chemical composition materials may be used. Such di- and tri-functional materials include, but are not limited to polyethylene glycol, polypropylene glycol, glycerol-based polyether triols, trimethylolpropane-based polyether triols, and other similar compounds or mixtures, provided that they are ester-free. In some embodiments of the invention, at least 50 wt % of the ester-free polyol component consists of one or more polyether polyols.

In addition to the base polyols described above, or instead of them, materials commonly referred to as "copolymer polyols" may be included in a polyol component for use according to the invention. Copolymer polyols may be used in polyurethane foams to increase the resistance of the foam to deformation, for example to improve the load-bearing properties of the foam. Depending upon the load-bearing requirements for the polyurethane foam, copolymer polyols may comprise from 0 to about 80 percent by weight of the total polyol content. Examples of copolymer polyols include, but are not limited to, graft polyols and polyurea modified polyols, both of which are known in the art and are commercially available.

Graft polyols are prepared by copolymerizing vinyl monomers, typically styrene and acrylonitrile, in a starting polyol. The starting polyol is typically a glycerol-initiated triol, and is typically end-capped with ethylene oxide (approximately 80-85% primary hydroxyl groups). Some of the copolymer grafts to some of the starting polyol. The graft polyol also contains homopolymers of styrene and acrylonitrile and unaltered starting polyol. The styrene/acrylonitrile solids content of the graft polyol typically ranges from 5 wt % to 45 wt %, but any kind of graft polyol known in the art may be used.

Polyurea modified polyols are formed by the reaction of a diamine and a diisocyanate in the presence of a starting polyol, with the product containing polyurea dispersion. A variant of polyurea modified polyols, also suitable for use, are polyisocyanate poly addition (PIPA) polyols, which are formed by the in situ reaction of an isocyanate and an alkanolamine in a polyol.

Natural Oil Polyol Component

Polyols useful in the preparation of polyurethane foam from inexpensive and renewable resources are highly desirable to minimize the depletion of fossil fuel and other non-sustainable resources. Natural oils comprise triglycerides of saturated and unsaturated fatty acids. One natural oil polyol is castor oil, a natural triglyceride of ricinoleic acid which is commonly used to make polyurethane foam even though it has certain limitations such as low hydroxyl content. Other natural oils need to be chemically modified to introduce sufficient hydroxyl content to make them useful in the production of polyurethane polymers. There are two chemically reactive sites that can be considered when attempting to modify natural oil or fat into a useful polyol: 1) the unsaturated sites (double bonds); and 2) the ester functionality. Unsaturated sites present in oil or fat can be hydroxylated via epoxidation/ring opening or hydroformilation/hydrogenation. Alternatively, trans-esterification can also be utilized to introduce OH groups in natural oil and fat. The chemical process for the preparation of natural polyols using epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats include fish, tallow and lard. These natural oils are triglycerides of fatty acids which may be saturated or unsaturated with various chain lengths from C12 to C24. These acids can be: 1) saturated: lauric, myristic, palmitic, steric, arachidic and lignoceric; 2) mono-unsaturated: palmitoleic, oleic, 3) poly-unsaturated: linoleic, linolenic, arachidonic. Partially or fully epoxidized natural oil may be prepared when reacting peroxyacid under suitable reaction conditions. Examples of peroxyacids utilized in the epoxidation of oils have been described in WO 2006/116456 A1; hereby incorporated by reference. Ring opening of the epoxidized oils with alcohols, water and other compounds having one or multiple nucleophilic groups can be used. Depending on the reaction conditions oligomerization of the epoxidized oil can also occur. Ring opening yields natural oil polyol that can be used for the manufacture of polyurethane products. In the hydroformilation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, polyol form natural oil and fats can be produced by trans-esterification with a suitable poly-hydroxyl containing substance using an alkali metal or alkali earth metal base or salt as a trans-esterification catalyst. Any natural oil or alternatively any partially hydrogenated oil can be used in the transesterification process. Examples of oils include but are not limited to soybean, corn, cottonseed, peanut, castor, sunflower, canola, rapeseed, safflower, fish, seal, palm, tung, olive oil or any blend. Any multifunctional hydroxyl compound can also be used such as lactose, maltose, raffinose, sucrose, sorbitol, xylitol, erythritol, mannitol, or any combination.

NOPs can be used alone or in combination with the previously described polyols. Polyols amounts are defined by pphp. There are typically 3 types of polyols above defined: standard polyol or polyether polyol which can be used in the range of about 100 pphp (the only polyol) to about 10 pphp. The copolymer polyol (CPP) can be used in the range of about 0 to about 80 pphp. Finally the NOP (natural oil polyol) which typically can be present from about 0 to about 50 pphp.

Blowing Agents

Polyurethane foam production may be aided by the inclusion of a blowing agent (BA) to produce voids in the polyurethane matrix during polymerization. Any suitable blowing agent may be used.

Suitable blowing agents include compounds with low boiling points which are vaporized during the exothermic polymerization reaction. Such blowing agents are generally inert or they have low reactivity and therefore it is likely that they will not decompose or react during the polymerization reaction. Examples of blowing agents include, but are not limited to, carbon dioxide, chlorofluorocarbons (CFCs), hydrofluorocarbons (HFCs), hydrochlorofluorocarbons (HCFCs), fluoroolefins (FOs), chlorofluoroolefins (CFOs), hydrofluoroolefins (HFOs), hydrochlorfluoroolefins (HCFOs), acetone, and low-boiling hydrocarbons such as cyclopentane, isopentane, n-pentane, and their mixtures. Other suitable blowing agents include compounds, for example water, that react with isocyanate compounds to produce a gas. The amount of BA is typically from about 0 (water blown) to about 80 pphp. Water (blow foam by reacting with isocyanate making CO2) can be present in the range from about 0 (if a BA is included) to about 60 pphp (a very low density foam) and typically from about 1.0 pphp to about 10 pphp and, in some cases, from about 2.0 pphp to about 5 pphp.

Other Optional Components

A variety of other ingredients may be included in the formulations for making foams according to the invention. Examples of optional components include, but are not limited to, cell stabilizers, crosslinking agents, chain extenders, pigments, fillers, flame retardants, auxiliary urethane gelling catalysts, auxiliary urethane blowing catalysts, transition metal catalysts, and combinations of any of these.

Cell stabilizers may include, for example, silicone surfactants or anionic surfactants. Examples of suitable silicone surfactants include, but are not limited to, polyalkylsiloxanes, polyoxyalkylene polyol-modified dimethylpolysiloxanes, alkylene glycol-modified dimethylpolysiloxanes, or any combination thereof. Suitable anionic surfactants include, but are not limited to, salts of fatty acids, salts of sulfuric acid esters, salts of phosphoric acid esters, salts of sulfonic acids, and combinations of any of these.

Crosslinking agents include, but are not limited to, low-molecular weight compounds containing at least two moieties selected from hydroxyl groups, primary amino groups, secondary amino groups, and other active hydrogen-containing groups which are reactive with an isocyanate group. Crosslinking agents include, for example, polyhydric alcohols (especially trihydric alcohols, such as glycerol and trimethylolpropane), polyamines, and combinations thereof. Non-limiting examples of polyamine crosslinking agents include diethyltoluenediamine, chlorodiaminobenzene, diethanolamine, diisopropanolamine, triethanolamine, tripropanolamine, 1,6-hexanediamine, and combinations thereof. Typical diamine crosslinking agents comprise twelve carbon atoms or fewer, more commonly seven or fewer.

Examples of chain extenders include, but are not limited to, compounds having hydroxyl or amino functional group, such as glycols, amines, diols, and water. Specific non-limiting examples of chain extenders include ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminoethane, 2,4-toluenediamine, or any mixture thereof.

Pigments may be used to color code the polyurethane foams during manufacture, for example to identify product grade or to conceal yellowing. Pigments may include any suitable organic or inorganic pigments known in the polyurethane art. For example, organic pigments or colorants include, but are not limited to, azo/diazo dyes, phthalocyanines, dioxazines, and carbon black. Examples of inorganic pigments include, but are not limited to, titanium dioxide, iron oxides, or chromium oxide.

Fillers may be used to increase the density and load bearing properties of polyurethane foams. Suitable fillers include, but are not limited to, barium sulfate or calcium carbonate.

Flame retardants may be used to reduce the flammability of polyurethane foams. For example, suitable flame retardants include, but are not limited to, chlorinated phosphate esters, chlorinated paraffins, or melamine powders.

Cell stabilizers can used in an amount from about 0.1 to about 20 pphp and typically from about 0.1 to about 10 pphp and, in some cases, from about 0.1 to about 5.0 pphp. Fire retardants can be used in an amount from about 0 to about 20 pphp and from about 0 to about 10 pphp and from about 0 to about 5 pphp. All other additives are typically used in amounts ranging from about 0.1 pphp to about 20 pphp The following Examples are provided to illustrate certain aspects of the invention and shall not limit the scope of the claims appended hereto.

EXAMPLES

Listed are the TDI based polyurethane foam formulations which were used to evaluate the cell openers and cell opener aids using conventional acid blocked or non-blocked tertiary amine catalysts in free-rise and molded foams. Foam pads were removed from the heated mold and allowed to cool down to room temperature to monitor dimensional stability (shrinkage).

Handmix Evaluations

Handmix experiments were conducted using the following procedure. Formulations were blended together for approximately 10 minutes using a mechanical mixer equipped with a 7.6 cm diameter high shear mixing blade, rotating at 5000 rpm. Premixed formulations were maintained at 23±1° C. using a low temperature incubator. Mondur TD-80 (an 80/20 2,4/2,6 isomer blend of toluene diisocyanate) or modified MDI was added to the premix at the correct stoichiometric amount for the reported index of each foam. The mixture was blended together with Premier Mill Corporation Series 2000, Model 89, and dispersed for approximately five seconds. The foaming mixture was transferred to an Imperial Bondware #GDR-170 paper bucket and allowed to free rise while data was recorded.

Machine Evaluations

Machine runs for the flexible molded foam were conducted on a Hi Tech Sure Shot MHR-50, cylinder displacement series and high-pressure machine. Fresh premixes, consisting of the appropriate polyols, water, crosslinker, surfactants and catalysts for each formulation were charged to the machine. Mondur TD-80 was used throughout the entire study. All chemical temperatures were held at 23±2° C. via the machine's internal temperature control units. Foam pours were made into an isothermally controlled, heated aluminum mold maintained at 63±2° C. The mold was a typical physical property tool designed with internal dimensions of 40.6 cm×40.6 cm×10.2 cm. The mold has five vents, each approximately 1.5 mm in diameter, centered in each corner 10.0 cm from each edge and the geometric center of the lid. The mold was sprayed with a solvent-based release agent, prior to every pour and allowed to dry for one minute before pouring. The foam premix was puddle poured into the center of the mold with a wet chemical charge weight capable of completely filling the mold and obtaining the desired core densities reported. Minimum fill requirements were established for each formulation evaluated. The foam article was demolded at 240 seconds (4 minutes) after the initial pour (detailed in next paragraph). Upon demold, the foam was placed through a mechanical crusher or tested for Force-to-Crush (FTC) measurements or allow to cool down to determine dimensional stability (detailed below).

Foam physical properties of each catalyst set were mechanically crushed 1 minute after demold using a Black Brothers Roller crusher set to a gap of 2.54 cm. Crushing was conducted three times on each part, rotating the foam 90 degrees after each pass through the rollers. All parts produced for physical testing were allowed to condition for at least seven days in a constant temperature and humidity room (23±2° C., 50±2% relative humidity).

FTC measurements were conducted 45 seconds after demold. The pad was removed from the mold, weighed and placed in the FTC apparatus. The force detection device is equipped with a 2.2 kg capacity pressure transducer mounted between the 323 cm$^2$ circular plate cross head and the drive shaft. The actual force is shown on a digital display. This device mimics the ASTM D-3574, Indentation Force Deflection Test and provides a numerical value of freshly demolded foam's initial hardness or softness. The pad was compressed to 50 percent of its original thickness at a cross-head velocity of 275 mm per minute with the force necessary to achieve the highest compression cycle recorded in Newton's. Ten compression cycles were completed. A cycle takes approximately 30 seconds to complete.

Example 1

Use of Cell Opening Aids to Minimize Cell Opening Use Levels

Foam pads were prepared by adding a tertiary amine catalyst to about 302 g of a premix (prepared as in Table 2) in a 32 oz (951 ml) paper cup. The formulation was mixed for about 10 seconds at about 6,000 RPM using an overhead stirrer fitted with a 2-inch (5.1 cm) diameter stirring paddle.

The toluene diisocyanate was then added, and the formulation was mixed well for about another 6 seconds at about 6,000 RPM using the same stirrer, after which it was poured into a pre-heated mold at 70° C. and demolded after 4 minutes. The foam pads were removed from the mold, hand crushed, weighed and machine crushed at 75% pad thickness. Dimensional stability (foam shrinkage) was evaluated by allowing the foam pads to cool down and observing whether shrinkage or not took place. Foam pads were stored under constant temperature and humidity conditions for 48 hours before being cut and tested.

TABLE 2

| Premix Components | |
|---|---|
| Component | Parts by weight |
| Hyperlite E848[1] | 100 |
| Water | 3.7 |
| DABCO ® DC5164[2] | 0.10 |
| DABCO ® DC5169[3] | 0.60 |
| DABCO ® 33LX[4] | 0.30 |
| DABCO ® BL11[5] | 0.10 |
| Diethanolamine-LF (crosslinker) | 1.04 |
| Toluene diisocyanate | To provide NCO index = 100 |

[1]High functionality capped polyether polyol of high molecular weight, functionality, and primary hydroxyl content with a base polyol molecular weight of about 5500, available from Dow Chemical Company, Midland, MI
[2,3]Silicone surfactant available from Air Products and Chemicals, Inc.
[4,5]Amine catalyst available from Air Products and Chemicals, Inc.

Column 1 and 2 in table 3 shows that in the absence of a cell opening aide unstable foam is produced when the level of 2-cyanoacetamide is ≤0.045 PPHP. Poor dimensional stability was also observed when using diols such as 2-methylpropanediol (MP-diol), dipropylene glycol and diethylene glycol as cell opening aids in the presence of 0.03 pphp of 2-cyanoacetamide. However, use of aides such as DMSO, DMI, sulfolane, PEG-200, MMAA, and DMAA, helped 2-cyanoacetamide to be an effective cell opener when used at 0.030 pphp. Thus, a 30% reduction in use level was achieved when using cell opening aids.

TABLE 3

Dimensional Stability Results

| Component | 1 PPHP | 2 PPHP | 3 PPHP | 4 PPHP | 5 PPHP | 6 PPHP | 7 PPHP | 8 PPHP | 9 PPHP | 10 PPHP |
|---|---|---|---|---|---|---|---|---|---|---|
| Dabco ® 33LV | 0.30 | 0.30 | 0.30 | 0.30 | 0.30 | 0.30 | 0.30 | 0.30 | 0.30 | 0.30 |
| Dabco ® BL11 | 0.10 | 0.10 | 0.10 | 0.10 | 0.10 | 0.10 | 0.10 | 0.08 | 0.08 | 0.08 |
| Cell Opener (Cyanoacetamide) | ≤0.040 | 0.045 | 0.030 | 0.030 | 0.030 | 0.030 | 0.030 | 0.03 | 0.030 | 0.030 |
| Aide | None | None | DPG | DEG | MP-diol | DMI | DMSO | Sulfolane | MMAA | DMAA |
|  | — | — | 0.20 | 0.20 | 0.20 | 0.12 | 0.12 | 0.12 | 0.12 | 0.12 |
| Formic Acid | 0.01 | 0.01 | 0.01 | 0.01 | 0.01 | 0.01 | 0.01 | 0.01 | 0.01 | 0.01 |
| Ext. Time | 53 | 52 | 51 | 52 | 51 | 51 | 50 | 53 | 47 | 48 |
| SGT | 64 | 66 | 63 | 66 | 65 | 63 | 65 | 64 | 64 | 65 |
| Mold Pressure | N | N | N | Y | N | N | N | N | N | N |
| Dimensional Stability | Unstable | Stable | Unstable | Unstable | Unstable | Stable | Stable | Stable | Stable | Stable |
| Collapse | N | N | N | N | N | N | N | N | N | N |

Example 2

Use of Cell Opening Aids to Minimize Cell Opening Use Levels

Table 4 shows the results when 2-cyanoacetamide was used in the presence of pentamethyldiethylenetriamine blowing catalyst and triethylenediamine gelling catalyst. As previously shown poor dimensional stability was observed when using typical diols such as 2-methylpropanediol (MP-diol), dipropylene glycol and diethylene glycol as cell opening aids. Best dimensional stability was observed when PEG-200, DMSO, DMI, and sulfolane were used.

TABLE 4

Dimensional Stability Results

| Component | 1 PPHP | 2 PPHP | 3 PPHP | 4 PPHP | 5 PPHP | 6 PPHP | 7 PPHP |
|---|---|---|---|---|---|---|---|
| Dabco ® 33LV | 0.30 | 0.30 | 0.30 | 0.30 | 0.30 | 0.30 | 0.30 |
| Polycat ®-5 | 0.08 | 0.08 | 0.08 | 0.08 | 0.08 | 0.08 | 0.08 |
| Cell Opener (Cyanoacetamide) | 0.050 | 0.050 | 0.050 | 0.050 | 0.050 | 0.050 | 0.050 |
| Aide | DPG | DEG | MP-diol | PEG-200 | Sulfolane | DMSO | DMI |
|  | 0.45 | 0.28 | 0.45 | 0.16 | 0.16 | 0.16 | 0.16 |
| Formic Acid | 0.01 | 0.01 | 0.01 | 0.01 | 0.01 | 0.01 | 0.01 |
| Ext. Time | 56 | 55 | 56 | 57 | 57 | 56 | 58 |
| SGT | 67 | 69 | 69 | 66 | 69 | 66 | 67 |
| Mold Pressure | N | Y | N | N | N | N | N |
| Dimensional Stability | Unstable | Unstable | Unstable | Stable | Stable | Stable | Stable |
| Foam Collapse | N | N | N | N | N | N | N |

Example 3

Use of Cell Opening Aids to Minimize Cell Opening Use Levels

Table 5 illustrates how mixtures of solvent aides could also help in improving the performance of a cell opener. Using a polar aprotic solvent mixture (such as DMSO and propylene carbonate) helped providing dimensionally stable foam. On the other hand, the introduction of diethylene glycol resulted in foam shrinkage.

TABLE 5

Dimensional Stability Results

| Component | 1 | 2 | 3 | 4 |
|---|---|---|---|---|
| Dabco ® 33LV | 0.30 | 0.30 | 0.30 | 0.30 |
| Dabco ® BL11 | 0.10 | 0.10 | 0.10 | 0.10 |
| Cell Opener (Cyanoacetamide) | 0.070 | 0.07 | 0.07 | 0.07 |
| Aide 1 | DMSO | DMSO | DMSO | DMSO |
|  | 0.04 | 0.04 | 0.04 | 0.04 |
| Aide 2 | DEG | DEG | Propylene Carbonate | Propylene Carbonate |
|  | 0.07 | 0.07 | 0.05 | 0.04 |

TABLE 5-continued

Dimensional Stability Results

| Component | 1 | 2 | 3 | 4 |
|---|---|---|---|---|
| Formic Acid | 0.01 | — | — | — |
| Acetic Acid | — | 0.02 | 0.02 | 0.02 |
| Ext. Time | ~52 | ~52 | ~52 | ~52 |
| SGT | ~64 | ~64 | ~64 | ~64 |
| Mold Pressure | N | N | N | Y |
| Dimensional Stability | Unstable | Unstable | Stable | Stable |
| Foam Collapse | N | N | N | N |

Example 4

Use of Cell Opening Aids to Minimize Cell Opening Use Levels

Table 6 illustrates that cell opening aides have similar effect on 2-cyanoacetamide when using non-acid blocked amine catalysts yielding the same results as described in the previous examples.

TABLE 6

Dimensional Stability Results

| | Component | | | | | | |
|---|---|---|---|---|---|---|---|
| | 1 PPHP | 2 PPHP | 3 PPHP | 4 PPHP | 5 PPHP | 6 PPHP | 7 PPHP |
| Dabco ® 33LV | 0.30 | 0.30 | 0.30 | 0.30 | 0.30 | 0.30 | 0.30 |
| Dabco ® BL11 | 0.10 | 0.10 | 0.10 | 0.10 | 0.10 | 0.10 | 0.10 |
| Cell Opener (Cyanoacetamide) | 0.035 | 0.035 | 0.035 | 0.035 | 0.035 | 0.035 | 0.035 |
| Aide | DPG | DEG | MP-diol | PEG-200 | Sulfolane | DMSO | DMI |
| | 0.13 | 0.13 | 0.13 | 0.13 | 0.13 | 0.13 | 0.13 |
| Ext. Time | 53 | 51 | 51 | 57 | 57 | 56 | 58 |
| SGT | 64 | 62 | 64 | 66 | 69 | 66 | 67 |
| Mold Pressure | N | N | N | N | N | N | N |
| Dimensional Stability | Unstable | Unstable | Unstable | Stable | Stable | Stable | Stable |
| Collapse | N | N | N | N | N | N | N |

Example 5

Use of Cell Opening and Cell Opening Aids to Optimize Physical Properties of Natural Oil Polyol Containing Polyurethane Foam Table 7 illustrates that 12% solution of 2-cyanoacetamide dissolved in N-methylacetoacetamide and added to polyurethane foam formulations containing natural oil polyols help providing foam with better physical properties such as ILDs as well as tensile, tear and elongation. The utilization of a solution of 2-cyanoacetamide in a polyurethane formulation can help maximizing the utilization of natural oil polyols increasing the renewable content of the finished product.

TABLE 7

Physical Properties

| Component/Property | Units | Control | NOP |
|---|---|---|---|
| Polycat ®-15 | PPHP | 0.49 | 0.49 |
| Dabco ® BL11 | PPHP | 0.10 | 0.10 |

TABLE 7-continued

Physical Properties

| Component/Property | Units | Control | NOP |
|---|---|---|---|
| 12% solution of 2-Cyanoacetamide in N-monomethylacetoacetamide | PPHP | — | 0.75 |
| TDI Index | % | 100 | 100 |
| Density | Kg/m3 | 40 | 40 |
| Air Flow | SCFH | 3.8 | 3.7 |
| Tear | N/m | 313 | 360 |
| Tensile | kPa | 131 | 144 |
| Elongation | % | 91 | 96 |
| ILD 25% | N | 149 | 224 |
| ILD 65% | N | 389 | 474 |
| ILD 25% return | N | 118 | 167 |

While the invention has been described with reference to certain aspects or embodiments, it will be understood by those skilled in the art that various changes may be made and equivalents may be substituted for elements thereof without departing from the scope of the invention. In addition, many modifications may be made to adapt the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A process for making polyurethane foam comprising: contacting a composition comprising at least one natural oil polyol, at least one cell opener and at least one cell opener aid, with at least one isocyanate in the presence of tertiary amine catalysts or acid blocked tertiary amine catalysts, wherein the cell opener comprises molecules containing active methylene or methine groups and the cell opener aid comprises at least one member selected from the group consisting of 1,3-dimethyl-2-imidazolidinone, sulfolane, N-methyl-acetoacetamide, and N,N-dimethylacetoacetamide.

2. The process of claim 1 wherein the cell opener comprises 2-cyanoacetamide.

3. The process of claim 1 wherein the catalyst comprises at least one tertiary amine catalyst.

4. The process of claim 1 wherein the natural oil polyol comprises triglycerides of saturated and unsaturated fatty acids.

5. The process of claim 1 wherein the composition further comprises at least one carboxylic acid.

6. The process of claim 1 further comprising molding a polyurethane foam without mechanical crushing in order to open cells within the foam.

7. A process comprising contacting a composition comprising at least one natural oil polyol, at least one copolymer polyol, at least one cell opener, at least one cell opener aid, and at least one tertiary amine catalyst; wherein the cell opener comprises molecules containing active methylene or methine groups and the cell opener aid comprises at least one member selected from the group consisting of 1,3-dimethyl-2-imidazolidinone, sulfolane, N-methyl-acetoacetamide, and N,N-dimethylacetoacetamide, with at least one isocyanate.

8. The process of claim 7 wherein the composition further comprises at least one acid comprising at least one of acetic and formic acids.

9. The process of claim 7 wherein the cell opener comprises 2 cyanoacetamide.

10. The process of claim 1 wherein the composition further comprises at least one copolymer polyol.

11. The process of claim 1 wherein the composition further comprises at least one acid comprising at least one of acetic and formic acids.

12. The process of claim 7 wherein the composition further comprises at least one carboxylic acid.

13. The process of claim 7 wherein the natural oil polyol comprises triglycerides of saturated and unsaturated fatty acids.

14. The process of claim 7 further comprising molding a polyurethane foam without mechanical crushing in order to open cells within the foam.

15. A process for making polyurethane foam comprising contacting a composition comprising at least one natural oil polyol, 2-cyanoacetamide, at least one cell opener aid, at least one tertiary amine catalyst and at least one acid comprising at least one of acetic and formic acids, wherein the cell opener aid comprises at least one member selected from the group consisting of 1,3-dimethyl-2-imidazolidinone, sulfolane, N-methyl-acetoacetamide, and N,N-dimethylacetoacetamide.

* * * * *